United States Patent [19]
Fatula

[11] 3,733,929
[45] May 22, 1973

[54] INDEXING APPARATUS

[75] Inventor: James J. Fatula, Perry Township, Lawrence County, Pa.

[73] Assignee: Ryman Engineering Company, Ellwood City, Pa.

[22] Filed: Aug. 20, 1971

[21] Appl. No.: 173,397

[52] U.S. Cl. .................................74/822, 74/813 L
[51] Int. Cl. .............................................B23b 29/32
[58] Field of Search ....................74/813 L, 817, 822, 74/825, 826; 82/36 A; 279/5; 408/71, 90

[56] References Cited

UNITED STATES PATENTS

| 3,580,111 | 5/1971 | Tyrner | 74/817 |
| 3,633,442 | 1/1972 | Stoen | 74/822 |

Primary Examiner—Allan D. Herrmann
Assistant Examiner—F. D. Shoemaker
Attorney—Martin J. Carroll

[57] ABSTRACT

Indexing apparatus includes a housing, a rotatable indexing shaft mounted in the housing, a spider mounted on the shaft for rotation therewith, a plurality of rollers equally spaced about the periphery of the spider, and an indexing bracket mounted in the housing for movement transversely of the shaft. A stop block on the bracket engages one of the rollers to prevent rotation of the spider. A slotted arm on the bracket engages another roller to rotate the spider when the first roller is disengaged from the stop block.

11 Claims, 6 Drawing Figures

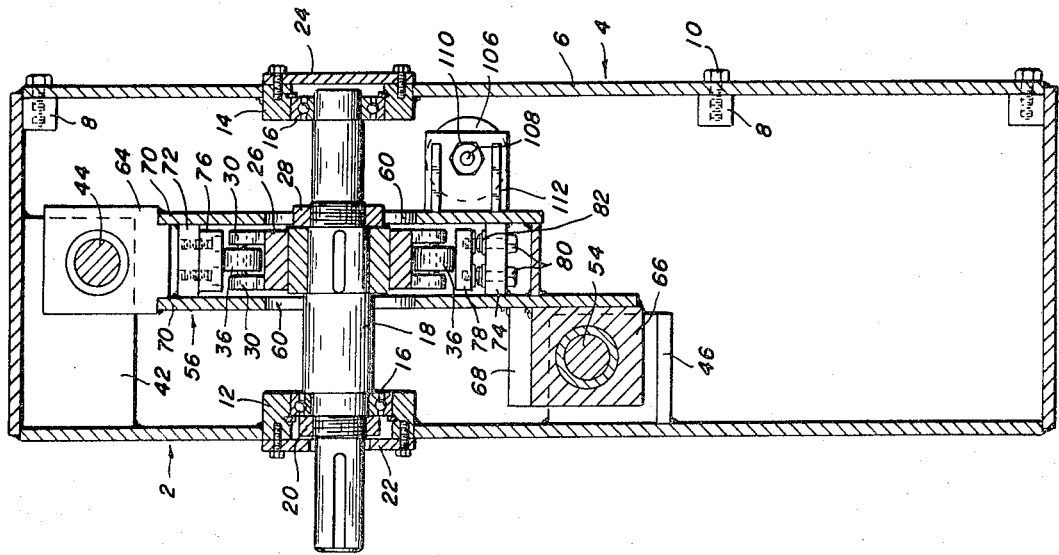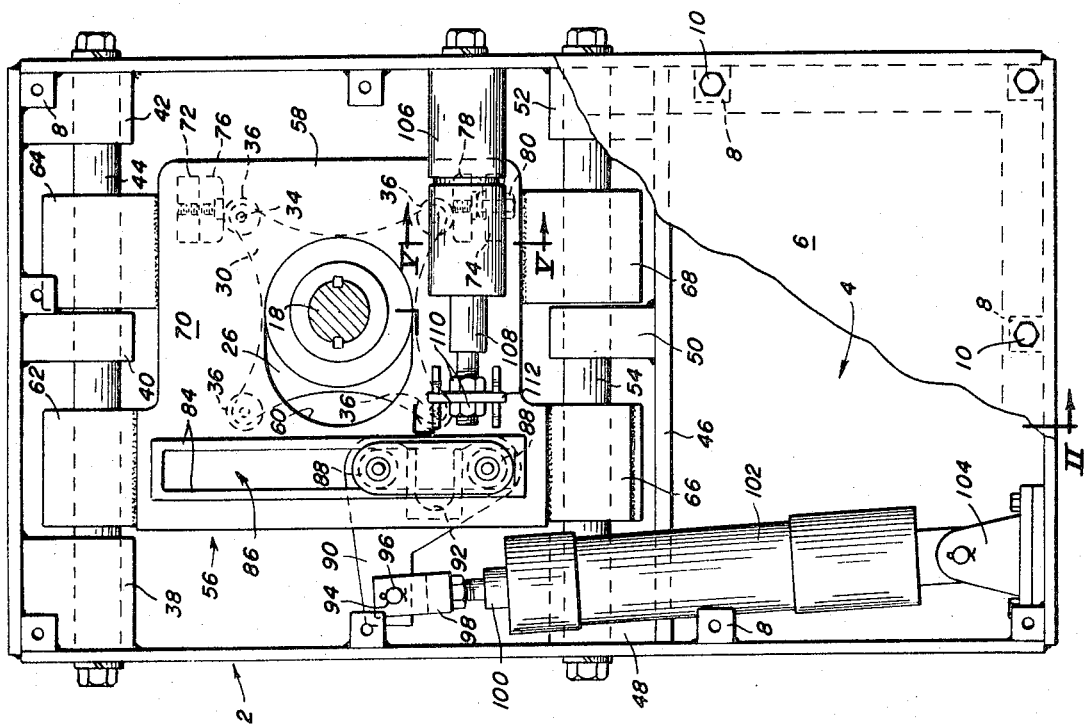

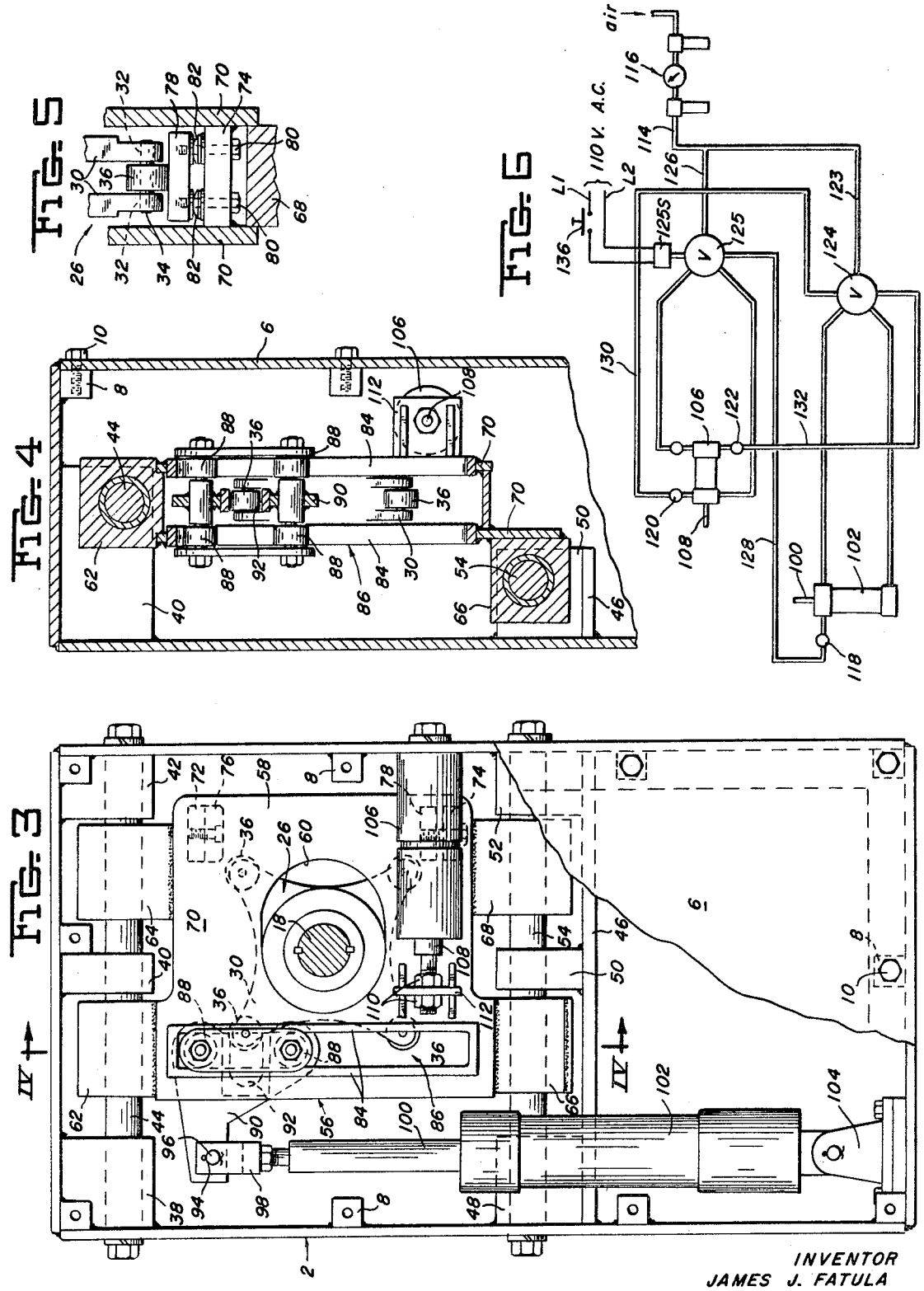

INDEXING APPARATUS

This invention relates to indexing apparatus and more particularly to such apparatus for indexing a shaft for positioning a workholder or the like. The most common indexing apparatus of which I have knowledge is the Geneva lock. These and other indexing apparatus of which I have knowledge have at least some of the following drawbacks. Their indexing time is tied in with their dwell time so if the dwell time is long the indexing time is long with the result that the indexing mechanism and the machine in which it is incorporated are not efficient. They cannot handle high inertia loads properly. Some such mechanisms cannot be entirely enclosed or can only be enclosed with difficulty so that they are exposed to dirty atmosphere or other deleterious surroundings. Some are expensive to build and/or maintain and/or are not rugged in construction.

It is therefore an object of my invention to provide indexing apparatus which is relatively simple in construction and operation and is relatively inexpensive to build and maintain.

Another object is to provide such apparatus which is rugged in construction, avoids sliding contact and which can be entirely enclosed.

Still another object is to provide such apparatus in which the indexing time is independent of the dwell time and which can handle high inertia loads.

These and other objects will be more apparent after referring to the following specification and attached drawings, in which:

FIG. 1 is an elevation of the apparatus of my invention with part of the cover plate removed;

FIG. 2 is a view taken on the line II—II of FIG. 1;

FIG. 3 is a view, similar to FIG. 1, showing the parts in a different position;

FIG. 4 is a view taken on the line IV—IV of FIG. 3;

FIG. 5 is a view taken on the line V—V of FIG. 1; and

FIG. 6 is a schematic view of the pneumatic system of my invention.

Referring more particularly to the drawings, reference numeral 2 indicates a housing for enclosing the parts of my apparatus. The housing is preferably made of steel plates welded together and has an open side 4 which is closed by a steel plate or cover 6. For this purpose a plurality of internally threaded lugs or nuts 8 are welded to the inside of housing 2 around the periphery of opening 4 and the cover 6 attached by means of capscrews 10. A tubular bearing support 12 is provided on the side of housing 2 opposite opening 4 and a similar bearing support 14 is provided on cover 6 in axial alignment with bearing support 12. Axially aligned bearings 16 are provided in supports 12 and 14 for receiving indexing shaft 18 which has a portion extending outside the housing. This end of the shaft is adapted to be connected to a shaft for supporting a workholder or the like (not shown) which is to be indexed. The left hand bearing 16 as seen in FIG. 2 is held between a nut 20 threaded on shaft 18 and a shoulder on shaft 18. A cover plate 22 surrounding shaft 18 is attached to bearing support 12 by capscrews. A cover plate 24 is likewise secured to the outside of bearing support 14. A spider 26 is keyed to shaft 18 between a shoulder on the shaft and a nut 28 threaded on the shaft so that it rotates with the shaft. The spider 26 has four pairs of spaced arms 30 arranged 90° apart around the periphery. As best shown in FIG. 5 each pair of arms has axially aligned holes 32 for receiving a shaft 34 which supports a roller 36.

Three bearing blocks 38, 40 and 42 are welded to the inside of the top of housing 2 and have aligned openings therein for receiving a guide shaft 44 whose axis is oriented 90° from the axis of shaft 18 in a horizontal plane above the horizontal plane of shaft 18. A horizontal plate 46 is welded to the inside of housing 2 below the shaft 18 and three bearing blocks 48, 50 and 52 are welded thereto and to housing 2 below bearing blocks 38, 40 and 42 and shaft 18. The blocks 48, 50 and 52 have aligned openings therein for receiving guide shaft 54 parallel to shaft 44. An indexing bracket 56 is slidably mounted on shafts 44 and 54. The indexing bracket 56 is preferably made of steel plates and blocks welded together and has a hollow main body portion 58 with an elongated or oval hole 60 therethrough surrounding shaft 18. Two spaced apart arms 62 and 64 extend upwardly from body portion 58 one on each side of block 40 and have openings therethrough for receiving shaft 44. Two similar arms 66 and 68 extend downwardly from body portion 58 one on each side of block 50 and have openings therethrough for receiving shaft 54. The body portion 58 includes spaced sides 70 so as to provide a space for receiving the spider 26. Connecting bars 72 and 74 extend between and are welded to sides 70. A stop block 76 having a hardened surface is secured to the underside of bar 72 by means of capscrews. A similar stop block 78 (FIG. 5) is secured to the top of bar 74 by means of capscrews 80. However, a spring washer 82 preferably surrounds each capscrew between bar 74 and block 78 to compensate for machining errors.

Flame hardened bars 84 are welded to the sides 70 on that side of shaft 18 opposite stop blocks 76 and 78 to provide a vertical guide 86 for receiving rollers 88 mounted on an arm 90 having a horizontal slot 92 for receiving a spider roller 36. The other end of arm 90 has a hole 94 therein for receiving a pin 96 for connecting it to clevis 98 which in turn is connected to a piston rod 100 which is operable by a pneumatic indexing cylinder 102 pivotally mounted on a bracket 104 secured to the bottom of housing 2. A locking cylinder 106 has one end secured to housing 2 approximately at right angles to cylinder 102. Its piston rod 108 is attached to indexing bracket 56 by means of nuts 110 threaded thereon on opposite sides of a plate 112 welded to bracket 56.

As shown in FIG. 6 air is supplied to the pneumatic system through conduit 114 having a filter and pressure regulator unit 116 therein. The indexing cylinder 102 is preferably an Allen Air Cylinder Model AV — 2 ½ × 6 inches — BC with a 2 inch extra rod extension, Outboard Rod Extension, Outboard Rod Guide RG — 1 ½ inches. A bleeder valve 118, preferably an Allenair VR 2570 is provided at its head end. The locking cylinder 106 is preferably an Allen Air Cylinder Model E — 2 × 1 inches with Bleeder valves 120 and 122 at its head and rear ends. The valves 120 and 122 are preferably the same type as valve 118. Air is delivered from conduit 114 through conduit 123 to a four-way bleed valve 124 for cylinder 102 and through conduit 126 to a four-way bleed solenoid valve 125 for cylinder 106. Valve 118 is connected to valve 125 through conduit 128. Valve 120 is connected to valve 124 through conduit 130. Valve 122 is connected to valve 124 through conduit 132. The solenoid half of valve 125 has its solenoid 125S energized from 110 volt A.C. power source L1, L2 by depressing a push button switch 136.

When the mechanism is not operating the indexing cylinder or motor 102 is in its retracted position and the locking cylinder or motor 106 is in its forward or locking position as seen in FIG. 1. The switch 136 is depressed to energize solenoid 125S so as to activate valve 125. This causes piston rod 108 to retract and move the indexing bracket 56 from its extreme left hand position shown in FIG. 1 to its extreme right hand position shown in FIG. 3. This unlocks spider 26 by moving the stop blocks 76 and 78 away from the associated rollers 36 and also causes a third roller 36 to engage the slot 92 of arm 90. At the end of the retraction stroke the bleeder valve 122 is automatically activated bleeding pressure through conduit 132 and shifting valve 124 to cause cylinder 102 to move its piston rod 100 and arm 90 upwardly or forwardly. Movement of arm 90 carries roller 36 in slot 92 upwardly or forwardly, thus rotating spider 26 and shaft 18 through 90° to the position shown in FIG. 3. At the end of the forward stroke, bleeder valve 118 is automatically activated bleeding pressure through conduit 128 and shifting valve 125 causing cylinder 106 to move its piston rod 108 forwardly. This returns the indexing bracket 56 to its original locking position with two of the rollers 36 being engaged by stop blocks 76 and 78 to prevent rotation of spider 26 and with roller 36 removed from slot 92. At the end of the forward stroke the bleeder valve 120 is automatically activated bleeding pressure through conduit 130 and shifting valve 124 causing piston rod 100 to return to its retracted position. Then after a preset dwell time as determined by an independent signal device (not shown) the solenoid 125S is actuated and the cycle is repeated.

It will be understood that other means may be provided for moving the spider 26 and locking it in position. Operation of cylinders 102 and 106 could be manual instead of automatic. Also, if it is desired to rotate the indexing shaft 18 through a different angle than 90° the number of arms and rollers 36 on spider 26 would be changed from four to a number equal to 360 divided by the number of degrees in the desired angle. Thus, for a desired angle of 60°, the number of rollers 36 would be six instead of four.

It will also be understood that the mechanism could be readily and easily changed to cause rotation in the opposite direction.

While one embodiment of my invention has been shown and described, it will be apparent that other adaptations and modifications may be made without departing from the scope of the following claims.

I claim:

1. Indexing apparatus comprising a housing, an indexing shaft mounted in said housing for rotation about its axis, a spider secured to said shaft for rotation therewith, a plurality of rollers mounted on said spider and equally spaced about its periphery, an indexing bracket mounted in said housing for substantially straight line movement transversely of said shaft, locking means including a roller stop on said bracket selectively engaging at least one of said rollers to prevent rotation of said spider, moving means on said bracket selectively engaging another of said rollers to move it about the axis of said spider, means for causing relative movement of said rollers and said locking means into and out of engagement, and means for moving said moving means when said locking means is disengaged to rotate said spider and shaft about their axis.

2. Indexing apparatus according to claim 1 wherein said moving means includes a guide mounted on said bracket in spaced relationship with said roller stop, a roller engaging member movable along said guide, and means for moving said bracket between a position where one of said rollers engages said roller stop and no roller is engaged by said roller engaging member and a position where no roller engages said roller stop and a roller is engaged by said roller engaging member.

3. Indexing apparatus according to claim 2 including a pair of guide shafts mounted in said housing transversely of said indexing shaft one on opposite sides thereof, and bearing blocks on said bracket for receiving said guide shafts.

4. Indexing apparatus according to claim 3 in which said guide extends normal to said guide shafts, and in which said roller engaging member includes an elongated slot for receiving a roller.

5. Indexing apparatus according to claim 4 in which said means for moving said bracket includes a fluid cylinder and piston rod connected to said bracket, and said means for moving said moving means on said bracket includes a fluid cylinder and piston rod operably connected to said roller engaging member.

6. Indexing apparatus according to claim 1 in which four rollers are mounted on said spider, said bracket has spaced walls between which said spider is received, and said locking means includes a pair of roller stops secured between said walls and spaced apart a distance slightly greater than the distance between the outside of adjacent rollers.

7. Indexing apparatus according to claim 6 wherein said moving means includes a guide mounted on said bracket on the opposite side of said indexing shaft from said roller stops, a roller engaging member movable along said guide, and means for moving said bracket between a position where one of said rollers engages said roller stop and no roller is engaged by said roller engaging member and a position where no roller engages said roller stop and a roller is engaged by said roller engaging member.

8. Indexing apparatus according to claim 7 including a pair of guide shafts mounted in said housing transversely of said indexing shaft one each on opposite sides thereof, and bearing blocks on said bracket for receiving said guide shafts.

9. Indexing apparatus according to claim 8 in which said guide extends normal to said guide shafts, and in which said roller engaging member includes an elongated slot for receiving a roller.

10. Indexing apparatus according to claim 9 in which said means for moving said bracket includes a fluid cylinder and piston rod connected to said bracket, and said means for moving said moving means on said bracket includes a fluid cylinder and piston rod operably connected to said roller engaging member.

11. Indexing apparatus comprising a housing, an indexing shaft mounted in said housing for rotation about its axis, a spider secured to said shaft for rotation therewith, a plurality of rollers mounted on said spider and equally spaced about its periphery, an indexing bracket mounted in said housing for substantially straight line movement transversely of said shaft, said indexing bracket surrounding said shaft and having an opening therein substantially longer than the diameter of said shaft for receiving said shaft and permitting relative movement of said shaft with respect to said bracket, a roller stop movable with respect to said rollers and positionable to selectively engage one of said rollers to prevent rotation of said spider, moving means on said bracket selectively engaging another of said rollers to move it about the axis of said spider, means for causing relative movement of said rollers and said roller stop into and out of engagement, and means for moving said moving means when said roller stop is disengaged to rotate said spider and shaft about their axis.

* * * * *